United States Patent
Davydov et al.

(10) Patent No.: US 9,497,682 B2
(45) Date of Patent: Nov. 15, 2016

(54) CENTRAL PROCESSING UNIT AND METHODS FOR SUPPORTING COORDINATED MULTIPOINT TRANSMISSION IN AN LTE NETWORK

(71) Applicant: Intel Corporation, Santa Clara, CA (US)

(72) Inventors: Alexei Davydov, Nizhny Novgorod (RU); Gregory Morozov, Nizhny Novgorod (RU); Hong He, Beijing (CN); Apostolos Papathanassiou, San Jose, CA (US); Seunghee Han, Kyoungkido (KR)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 14/104,725

(22) Filed: Dec. 12, 2013

(65) Prior Publication Data

US 2014/0362745 A1 Dec. 11, 2014

Related U.S. Application Data

(60) Provisional application No. 61/832,644, filed on Jun. 7, 2013.

(51) Int. Cl.
*H04W 4/00* (2009.01)
*H04W 36/22* (2009.01)
(Continued)

(52) U.S. Cl.
CPC ............ *H04W 36/22* (2013.01); *H04L 5/0032* (2013.01); *H04L 5/0055* (2013.01); *H04L 5/14* (2013.01); *H04L 63/0442* (2013.01);
(Continued)

(58) Field of Classification Search
USPC .......................................... 370/280, 281, 329
See application file for complete search history.

(56) References Cited

U.S. PATENT DOCUMENTS 9,215,637 B2 12/2015 Ramamurthi et al.
9,288,734 B2 3/2016 Jha et al.
(Continued)

FOREIGN PATENT DOCUMENTS

CN 105164949 A 12/2015
CN 105165096 A 12/2015
(Continued)

OTHER PUBLICATIONS

"Backhaul Considerations for User Plane Architectures for Dual Connectivity", Qualcomm Incorporated, R2-131158, 3GPP TSG-RAN2 #81bis, Chicago, USA, [Online] retrieved from the internet: <http://www.3gpp.org/f tp/tsg_ran/wg2_r12/TSGR2_81bis/Docs/>, (Apr. 15-19, 2013), 1-3.
(Continued)

*Primary Examiner* — Phuongchau Ba Nguyen
(74) *Attorney, Agent, or Firm* — Schwegman Lundberg & Woessner, P.A.

(57) ABSTRACT

Embodiments of a central processing unit and methods for supporting coordinated multi-point (CoMP) transmissions in a 3GPP LTE network with non-ideal backhaul links are generally described herein. In some embodiments, the CPU may be arranged for scheduling and assigning resources for subordinate enhanced node Bs (eNBs) over the backhaul links for CoMP transmissions. The scheduling may include an additional number of HARQ processes to compensate, at least in part, for backhaul link latency.

12 Claims, 3 Drawing Sheets

(51) Int. Cl.
  *H04W 28/02* (2009.01)
  *H04N 21/24* (2011.01)
  *H04W 28/08* (2009.01)
  *H04L 5/00* (2006.01)
  *H04L 5/14* (2006.01)
  *H04W 72/04* (2009.01)
  *H04W 52/02* (2009.01)
  *H04W 36/30* (2009.01)
  *H04N 21/262* (2011.01)
  *H04W 36/24* (2009.01)
  *H04L 29/06* (2006.01)
  *H04W 8/00* (2009.01)
  *H04W 12/04* (2009.01)
  *H04W 36/14* (2009.01)
  *H04W 36/36* (2009.01)
  *H04W 84/12* (2009.01)
  *H04W 92/18* (2009.01)

(52) U.S. Cl.
  CPC ......... *H04N 21/24* (2013.01); *H04N 21/2401* (2013.01); *H04N 21/26208* (2013.01); *H04W 8/005* (2013.01); *H04W 12/04* (2013.01); *H04W 28/0289* (2013.01); *H04W 28/085* (2013.01); *H04W 36/24* (2013.01); *H04W 36/30* (2013.01); *H04W 52/0212* (2013.01); *H04W 72/0406* (2013.01); *H04W 28/08* (2013.01); *H04W 36/14* (2013.01); *H04W 36/36* (2013.01); *H04W 84/12* (2013.01); *H04W 92/18* (2013.01); *Y02B 60/50* (2013.01)

(56) References Cited

U.S. PATENT DOCUMENTS

| | | | |
|---|---|---|---|
| 9,326,207 B2 | 4/2016 | Jha et al. | |
| 2003/0007510 A1 | 1/2003 | Yeo et al. | |
| 2005/0185651 A1 | 8/2005 | Rinne | |
| 2005/0202823 A1 | 9/2005 | Shaheen et al. | |
| 2005/0262261 A1 | 11/2005 | Deshpande | |
| 2006/0019662 A1 | 1/2006 | Andrews et al. | |
| 2006/0245386 A1 | 11/2006 | Hu | |
| 2007/0025304 A1 | 2/2007 | Leelahakriengkrai et al. | |
| 2007/0076671 A1 | 4/2007 | Winget et al. | |
| 2008/0095119 A1 | 4/2008 | Bachmann et al. | |
| 2008/0220788 A1 | 9/2008 | Stanwood et al. | |
| 2009/0046656 A1 | 2/2009 | Kitazoe et al. | |
| 2009/0111468 A1 | 4/2009 | Burgess et al. | |
| 2009/0113086 A1 | 4/2009 | Wu et al. | |
| 2009/0124245 A1 | 5/2009 | Somasundaram et al. | |
| 2009/0285163 A1* | 11/2009 | Zhang | H04W 72/042 370/329 |
| 2010/0023830 A1* | 1/2010 | Wengerter | H04L 1/0025 714/748 |
| 2010/0135166 A1 | 6/2010 | Ahluwalia | |
| 2010/0169732 A1 | 7/2010 | Wu | |
| 2010/0240385 A1 | 9/2010 | Löhr et al. | |
| 2010/0275083 A1* | 10/2010 | Nam | H03M 13/6306 714/748 |
| 2010/0316096 A1* | 12/2010 | Adjakple | H04L 1/1887 375/211 |
| 2010/0329198 A1 | 12/2010 | Madan et al. | |
| 2011/0051654 A1* | 3/2011 | Blankenship | H04B 7/2606 370/315 |
| 2011/0053585 A1 | 3/2011 | Otonari | |
| 2011/0090802 A1 | 4/2011 | Kotrla et al. | |
| 2011/0113299 A1* | 5/2011 | Power | H04L 1/18 714/748 |
| 2011/0136446 A1 | 6/2011 | Komninakis et al. | |
| 2011/0141952 A1* | 6/2011 | Wang | H04L 1/1812 370/294 |
| 2011/0237272 A1* | 9/2011 | Gorokhov | H04B 7/024 455/452.1 |
| 2011/0249619 A1* | 10/2011 | Yu | H04B 7/024 370/328 |
| 2011/0261750 A1 | 10/2011 | Fujito et al. | |
| 2011/0310816 A1 | 12/2011 | Kim et al. | |
| 2011/0317560 A1 | 12/2011 | Aramoto et al. | |
| 2012/0057478 A1 | 3/2012 | BrÄnnström et al. | |
| 2012/0076040 A1 | 3/2012 | Hoshino et al. | |
| 2012/0087275 A1 | 4/2012 | Zhang et al. | |
| 2012/0120831 A1 | 5/2012 | Gonsa et al. | |
| 2012/0131204 A1 | 5/2012 | Song | |
| 2012/0178441 A1 | 7/2012 | Shaheen et al. | |
| 2012/0269140 A1* | 10/2012 | Nam | H04B 7/024 370/329 |
| 2012/0315905 A1 | 12/2012 | Zhu et al. | |
| 2013/0021991 A1* | 1/2013 | Ko | H04B 7/0413 370/329 |
| 2013/0028165 A1 | 1/2013 | Kim et al. | |
| 2013/0058308 A1 | 3/2013 | Jaiswal et al. | |
| 2013/0077543 A1 | 3/2013 | Kim et al. | |
| 2013/0083721 A1 | 4/2013 | Wu et al. | |
| 2013/0114575 A1* | 5/2013 | Fu | H04L 5/0053 370/336 |
| 2013/0142136 A1 | 6/2013 | Pi et al. | |
| 2013/0166644 A1 | 6/2013 | Sun et al. | |
| 2013/0176988 A1 | 7/2013 | Wang et al. | |
| 2013/0272169 A1* | 10/2013 | Wang | H04W 72/0446 370/280 |
| 2013/0308473 A1 | 11/2013 | Sun et al. | |
| 2013/0325684 A1 | 12/2013 | Vogler et al. | |
| 2013/0343252 A1 | 12/2013 | Chakraborty et al. | |
| 2013/0343293 A1 | 12/2013 | Jersenius et al. | |
| 2014/0029581 A1 | 1/2014 | Schatzmayr | |
| 2014/0036873 A1 | 2/2014 | Cheng et al. | |
| 2014/0064292 A1 | 3/2014 | Binetti et al. | |
| 2014/0122656 A1 | 5/2014 | Baldwin et al. | |
| 2014/0171069 A1 | 6/2014 | Pang et al. | |
| 2014/0204771 A1 | 7/2014 | Gao et al. | |
| 2014/0287717 A1 | 9/2014 | Golaup et al. | |
| 2014/0295840 A1 | 10/2014 | Keskitalo et al. | |
| 2014/0301241 A1 | 10/2014 | Kumar et al. | |
| 2014/0302853 A1 | 10/2014 | Militano et al. | |
| 2014/0328182 A1 | 11/2014 | Gao et al. | |
| 2014/0362689 A1 | 12/2014 | Koc et al. | |
| 2014/0362704 A1 | 12/2014 | Jha et al. | |
| 2014/0362752 A1 | 12/2014 | Jha et al. | |
| 2014/0362829 A1 | 12/2014 | Kazmi et al. | |
| 2014/0362832 A1* | 12/2014 | Rudolf | H04L 1/1822 370/336 |
| 2014/0366069 A1 | 12/2014 | Ramamurthi et al. | |
| 2014/0370906 A1 | 12/2014 | Lundborg et al. | |
| 2015/0020157 A1 | 1/2015 | Kim et al. | |
| 2015/0056992 A1* | 2/2015 | Morita | H04W 72/0426 455/435.1 |
| 2015/0109993 A1 | 4/2015 | Kojima | |
| 2015/0133137 A1* | 5/2015 | Lee | H04W 72/0486 455/452.1 |
| 2015/0156743 A1 | 6/2015 | Lee et al. | |
| 2015/0195716 A1 | 7/2015 | Worrall et al. | |
| 2015/0237644 A1* | 8/2015 | Golitschek Edler von Elbwart | H04W 72/12 370/329 |
| 2015/0270877 A1* | 9/2015 | Hessler | H04W 48/20 370/329 |
| 2015/0358111 A1* | 12/2015 | Marinier | H04L 1/0003 370/329 |
| 2016/0021567 A1 | 1/2016 | Agiwal et al. | |
| 2016/0044734 A1 | 2/2016 | Park et al. | |

FOREIGN PATENT DOCUMENTS

| | | |
|---|---|---|
| CN | 105191418 A | 12/2015 |
| CN | 105230085 A | 1/2016 |
| CN | 105247919 A | 1/2016 |
| KR | 1020110071406 A | 6/2011 |
| TW | 201505461 A | 2/2015 |
| TW | 201517645 A | 5/2015 |
| WO | WO-2011100492 A1 | 8/2011 |
| WO | WO-2012053840 A2 | 4/2012 |
| WO | WO-2012153961 A2 | 11/2012 |

(56) References Cited

FOREIGN PATENT DOCUMENTS

| WO | WO-2013051975 A1 | 4/2013 |
|---|---|---|
| WO | WO-2014049198 A1 | 4/2014 |
| WO | WO-2014197493 A1 | 12/2014 |
| WO | WO-2014197501 A1 | 12/2014 |
| WO | WO-2014197571 A1 | 12/2014 |
| WO | WO-2014197576 A1 | 12/2014 |
| WO | WO-2014197682 A1 | 12/2014 |
| WO | WO-2014197719 A1 | 12/2014 |

OTHER PUBLICATIONS

"Correction on implicit HARQ-ACK Resource Determination for PUCCH for Mat 1b with Channel Selection for TDD CA with Different UL-DL Configurations", CATT, R1-132691, 3GPP TSG-RAN WG1 Meeting #73, Fukuoka, Japan, (May 20, 2013), 2-4.

"Correction on UARQ-ACK Transmission for a UE con figured with PUCCH Format", Intel Corporation, R1-132684, 3GPP TSG-WG1 Meeting #73, Fukuoka, Japan, (May 20, 2013), 4-5.

"Discussion on S1 split for dual-connectivity", Interdigital Communications, R2-131326, 3GPP TSG-RAN WG2 #81bis, Chicago. USA, [Online] retrieved from the internet: <http://www.3gpp.org/ftp/tsg_ran/wg2_rl2/TSGR2_81bis/Docs/>, (Apr. 15-19, 2013).

"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10., (Jul. 2012), 210 pgs.

"Evolved Universal Terrestrial Radio Access (E-UTRA); Radio Resource Control (RRC); Protocol specification", 3GPP TS 36.331 version 10.6.0 Release 10., (Jul. 2012), 306 pgs.

"Evolved Universal Terrestrial Radio Access Network (E-UTRAN): Architecture description", 3GPP TS 36.401 version 10.4.0 Release 10, (2012), 22 pgs.

"International Application Serial No. PCT/US2014/040734, International Search Report mailed Sep. 12, 2014", 5 pgs.

"International Application Serial No. PCT/US2014/040734, Written Opinion mailed Sep. 12, 2014", 8 pgs.

"International Application Serial No. PCT/US2014/040743, International Search Report mailed Sep. 24, 2014", 3 pgs.

"International Application Serial No. PCT/US2014/040743, Written Opinion mailed Sep. 24, 2014", 5 pgs.

"International Application Serial No. PCT/US2014/040877, International Search Report mailed Sep. 25, 2014", 4 pgs.

"International Application Serial No. PCT/US2014/040877, Written Opinion mailed Sep. 25, 2014", 4 pgs.

"International Application Serial No. PCT/US2014/040882, International Search Report mailed Sep. 25, 2014", 3 pgs.

"International Application Serial. No. PCT/US2014/040882, Written Opinion mailed Sep. 25, 2014", 5 pgs.

"International Application Serial No. PCT/US2014/041068, International Search Report mailed Sep. 26, 2014", 3 pgs.

"International Application Serial No. PCT/US2014/041068, Written Opinion mailed Sep. 26, 2014", 5 pgs.

"International Application Serial No. PCT/US2014/041142, International Search Report mailed Oct. 1, 2014", 3 pgs.

"International Application Serial No. PCT/US2014/041142, Written Opinion mailed Oct. 1, 2014", 6 pgs.

"Mobility for dual connectivity", R2-130990, 3GPP TSG RAN WG2 Meeting #81bis, (2013).

"Power Preference Indication and Qos Requirements", ZTE Corporation, R2-130131 in 3GPP TSG-RAN WG2 Meeting #81 St Julians. Malta, (Jan. 28-Feb. 1, 2013).

"Radio link failure handling for dual connectivity", R2-131990, 3GPP TSG RAN WG2 Meeting #82, (May 2013), 1-2.

"Resource Coordination for Small Cells with Non-Ideal Backhaul", Samsung, R1-131027, 3GPP TSG RAN WG1 #72bis, Chicago, USA, (Apr. 15, 2013), 1-2.

"Transparent End-to-End Packet-Switched Streaming Service (PSS) :Progressive Download and Dynamic Adaptive Streaming over HTTP(3GP-DASH)", 3GPP TS 26.247 V 11.5.0 Release 11, (2013), 119 pgs.

"UP Radio Procotol for Dual Connecivity", LG Electronics Inc., R2-131231, 3GPP TSG-RAN2 Meeting #81bis, (Apr. 2013), 1-7.

"User Plane Architecture for Dual-Connectivity", R2-131939, 3GPP TSG-RAN WG2 #82, (May 2013).

Andrews, M., et al., "Optimal utility based multi-user throughput allocation subject to throughput constraints", IEEE INFOCOM vol. 4, (2005), 2415-2424.

Jalali, A, et al., "Data throughput of CDMA-HDR a high efficiency-high data rate personal communication wireless system", IEEE 51st Vehicular Technology Conference vol. 03, (2000), 1854-1858.

Liu, X., et al., "A framework for opportunistic scheduling in wireless networks", Computer Networks vol. 41, (2003), 451-475.

Lui, X., et al., "Opportunistic transmission scheduling with resource-sharing constraints in wireless networks", IEEE Selected Areas in Communications vol. 19 (10), (2006), 2053-2064.

Singh, S., et al., "Video capacity and QoE enhancements over LTE", IEEE International Conference on Communications (ICC), (2012), 7071-7076.

Stolyar, A. L., "On the Asymptotic Optimalityof the Gradient Scheduling Algorithm for Multiuser Throughput Allocation", Operations Research vol. 53, (2005), 12-25.

"U.S. Appl. No. 14/109,283, Non Final Office Action mailed Jul. 8, 2015", 14 pgs.

"U.S. Appl. No. 14/137,243, Non Final Office Action mailed Jul. 8, 2015", 11 pgs.

"U.S. Appl. No. 14/140,827, Response filed Jun. 19, 2015 to Restriction Requirement mailed Apr. 20, 2015", 8 pgs.

"U.S. Appl. No. 14/140,827, Restriction Requirement mailed Apr. 20, 2015", 7 pgs.

"U.S. Appl. No. 14/141,940, Non Final Office Action mailed May 22, 2015", 23 pgs.

"U.S. Appl. No. 14/141,940, Response filed Jul. 7, 2015 to Non Final Office Action mailed May 22, 2015", 23 pgs.

"U.S. Appl. No. 14/109,283, Advisory Action mailed Mar. 11, 2016", 2 pgs.

"U.S. Appl. No. 14/109,283, Final Office Action mailed Nov. 17, 2015", 16 pgs.

"U.S. Appl. No. 14/109,283, Response filed Feb. 17, 2016, to Final Office Action mailed Nov. 17, 2015", 13 pgs.

"U.S. Appl. No. 14/109,283, Response filed Oct. 8, 2015 to Non Final Office Action mailed Jul. 8, 2015", 12 pgs.

"U.S. Appl. No. 14/134,985, Final Office Action mailed Apr. 12, 2016", 26 pgs.

"U.S. Appl. No. 14/134,985, Non Final Office Action mailed Sep. 1, 2015", 30 pgs.

"U.S. Appl. No. 14/134,985, Response filed Dec. 22, 2015 to Non Final Office Action mailed Sep. 1, 2015", 30 pgs.

"U.S. Appl. No. 14/137,243, Notice of Allowance mailed Nov. 4, 2015", 11 pgs.

"U.S. Appl. No. 14/137,243, Response filed Oct. 8, 2015 to Non Final Office Action mailed Jul. 8, 2015", 9 pgs.

"U.S. Appl. No. 14/140,827, Non Final Office Action mailed Aug. 13, 2015", 16 pgs.

"U.S. Appl. No. 14/140/827, Notice of Allowance mailed Dec. 23, 2015", 9 pgs.

"U.S. Appl. No. 14/140,827, Response filed Nov. 12, 2015 to Non Final Office Action mailed Aug. 13, 2015", 17 pgs.

"U.S. Appl. No. 14/141,940, Examiner Interview Summary mailed Jul. 29, 2015", 3 pgs.

"U.S. Appl. No. 14/141,940, Notice of Allowability mailed Sep. 8, 2015", 2 pgs.

"U.S. Appl. No. 14/141,940, Notice of Allowance mailed Aug. 10, 2015", 9 pgs.

"Application Serial No. PCT/US2014/040882, International Preliminary Report on Patentability mailed Dec. 17, 2015", 7 pgs.

"Architectures for dual connecstivity", 3GPP RAN WG2 Meeting #81bis, R2-130989, (Apr. 2013), 6 pgs.

(56) References Cited

OTHER PUBLICATIONS

"Impacts of Splitting a Single EPS Bearer Between Two (or more) eNBs", 3GPP TSG RAN WG2 Meeting #81bis, R2-131529, (Apr. 2013), 5 pgs.
"International Application Serial No. PCT/US2014/040734, International Preliminary Report on Patentability mailed Dec. 17, 2015", 10 pgs.
"International Application Serial No. PCT/US2014/040743, International Preliminary Report on Patentability mailed Dec. 17, 2015", 7 pgs.
"International Application Serial No. PCT/US2014/040877, International Preliminary Report on Patentability mailed Dec. 17, 2015", 6 pgs.
"International Application Serial No. PCT/US2014/041068, International Preliminary Report on Patentability mailed Dec. 17, 2015", 7 pgs.
"International Application Serial No. PCT/US2014/041142, International Preliminary Report on Patentability mailed Dec. 17, 2015", 8 pgs.
"Issues on extended paging cycle in RRC_IDLE", LG Electronics Inc. 3GPP TSG-RAN WG2 #82 R2-131890, (May 20-24, 2013), 3 pgs.
"Taiwanese Application Serial No. 103119401, Office Action mailed Aug. 20, 2015", W/ English Search report, 7 pgs.
"Taiwanese Application Serial No. 103119401, Response filed Feb. 19, 2016 to Office Action mailed Aug. 20, 2015", (English Translation of Claims), 82 pgs.
"Taiwanese Application Serial No. 103119568, Office Action mailed Sep. 22, 2015", W/ English Translation, 13 pgs.
"Taiwanese Application Serial No. 103119568, Response filed Dec. 16, 2015 Office Action mailed Sep. 22, 2015", W/ English Claims, 14 pgs.
U.S. Appl. No. 15/069,229, filed Mar. 14, 2016, Traffic Splitting Based on Latency Between Cells.
U.S. Appl. No. 15/096,435, filed Apr. 12, 2016, Enhanced Node B and Methods for Providing System Information Updates to User Equipment With Extended Paging Cycles.

* cited by examiner

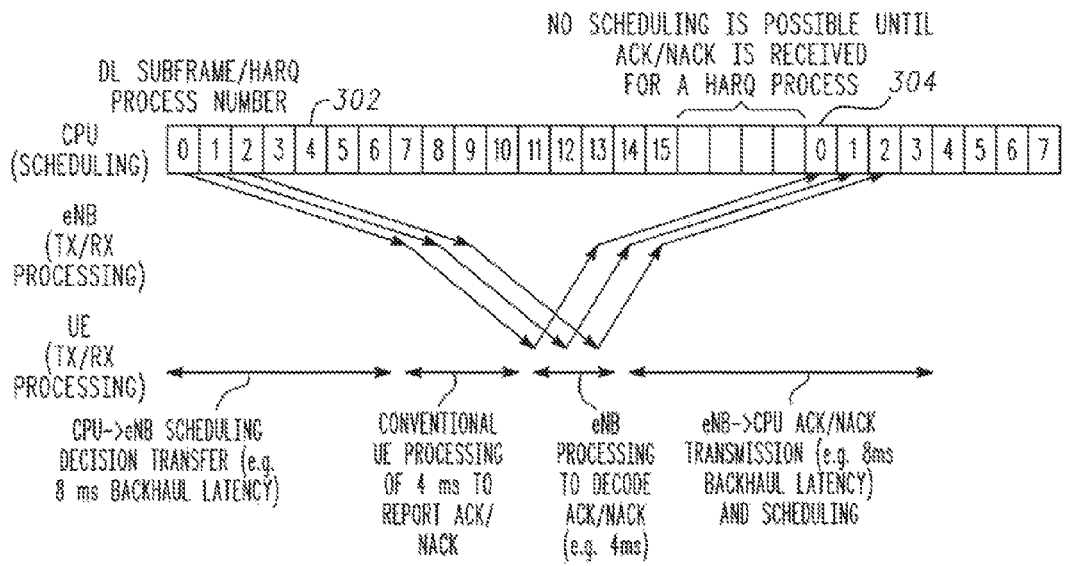

US 9,497,682 B2

CENTRAL PROCESSING UNIT AND METHODS FOR SUPPORTING COORDINATED MULTIPOINT TRANSMISSION IN AN LTE NETWORK

PRIORITY CLAIM

This application claims priority under 35 USC 119(e) to U.S. Provisional Patent Application Ser. No. 61/832,644, filed Jun. 7, 2013, which is incorporated herein by reference in its entirety.

TECHNICAL FIELD

Embodiments pertain to wireless communications. Some embodiments relate to coordinated multipoint (CoMP) operations in cellular networks, such as E-UTRAN networks operating in accordance with one of the 3GPP standards for the Long Term Evolution (LTE) (3GPP LTE).

BACKGROUND

By coordinating and combining signals from multiple antenna locations, CoMP operations may make it possible for mobile users to enjoy consistent performance and quality when they access and share videos, photos and other high-bandwidth services whether they are close to the center of a cell or at its outer edges. During CoMP operations, user equipment (UE) may receive signals from multiple sites (e.g., remote radio heads (RRHs) or subordinate enhanced Node B's (eNBs)) to take advantage of multiple reception to improve link performance and reduce interference. During CoMP operation, central processing unit (CPU) performs scheduling and coordinates the transmissions by the subordinate eNBs over non-ideal backhaul links. One issue with CoMP operations is that is difficult to schedule and synchronize transmissions to UEs over non-ideal backhaul links due to latency. Furthermore, the additional latency associated with non-ideal backhaul links makes it difficult to support continuous transmissions from all downlink subframes.

Thus there are general needs for systems and methods for CoMP operations that more efficiently schedules and synchronizes transmissions to UEs over non-ideal backhaul links. There are also general needs for systems and methods for CoMP operations that can support continuous transmissions from downlink subframes taking into account additional latency associated with non-ideal backhaul links.

BRIEF DESCRIPTION OF THE DRAWINGS

FIG. 3 illustrates HARQ process number assignment for downlink CoMP transmissions with backhaul link latency in accordance with some embodiments;

FIG. 4A illustrates a number of HARQ processes for various TDD UL/DL configurations in accordance with some embodiments;

FIG. 4B illustrates subframe usage for the various TDD UL/DL configurations of FIG. 4A;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
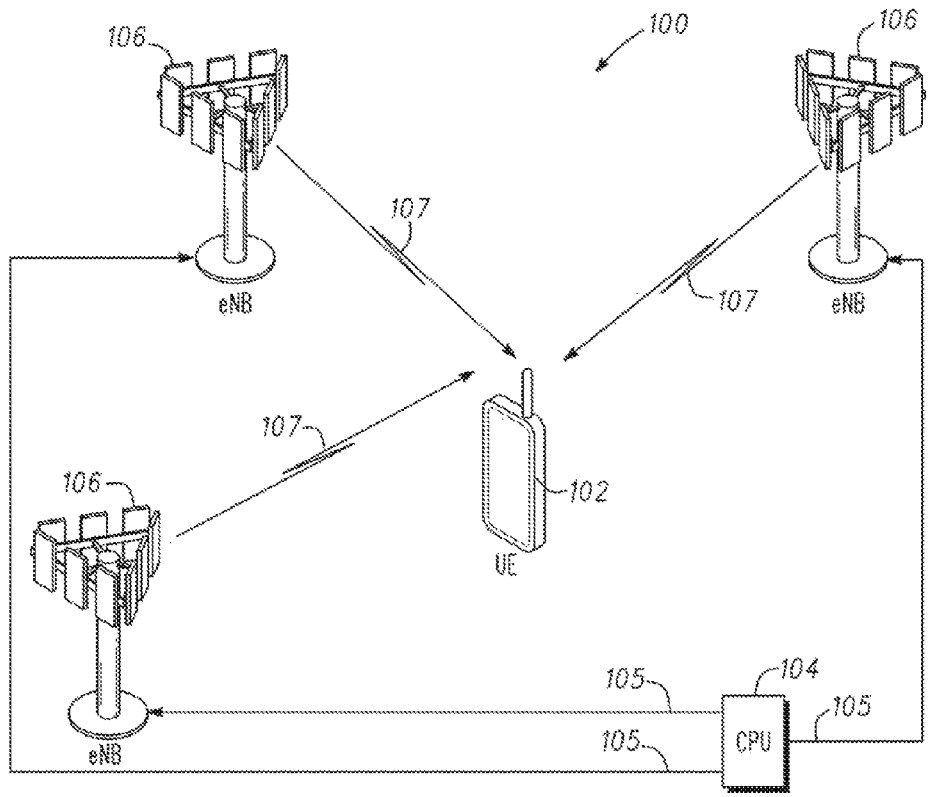
FIG. 1 illustrates a wireless network in accordance with some embodiments.

FIG. 1 illustrates a wireless network in accordance with some embodiments. Wireless network 100 may be a 3GPP LTE network and may include user equipment (UE) 102, a CPU 104 and a plurality of subordinate eNBs 106. In accordance with embodiments, network 100 may be configured for coordinated multi-point (CoMP) operations in which one or more downlink channels 107 are transmitted by the eNB 106 in a coordinated manner.

In accordance with some embodiments, the CPU 104 may be arranged for scheduling and assigning resources for the subordinate eNBs 106 over backhaul links 105 for CoMP transmissions. In these embodiments, the scheduling includes scheduling an additional number of hybrid automatic repeat request (HARQ) processes to compensate, at least in part, for backhaul link latency. The increased number of HARQ processes may support continuous CoMP transmissions by allowing a greater number of downlink subframes to be scheduled and transmitted. These embodiments, as well as other embodiments, are discussed in more detail below.

In some embodiments, the scheduling includes configuring downlink control information (DCI) to include a HARQ process number field with additional bits to indicate the additional number of HARQ processes.

In some embodiments, for frequency-division duplex (FDD) operation, the DCI is configured to include an HARQ process number field having four or more bits, and for time-division duplex (TDD) operation, the DCI is configured to include an HARQ process number field having five or more bits. In these embodiments, DCI format 2D may be modified to DCI format 2E by increasing the size of the HARQ process number field.

In some embodiments, the subordinate eNBs 106 are arranged to perform baseband processing and LTE subframe generation in response to scheduling information and assignment of resources by the CPU 104. The subordinate eNBs 106 are arranged for CoMP operation for transmission and reception of subframes from user equipment (UE) 102. In some embodiments, the CPU 104 may be part of one of the subordinate eNBs 106, although this is not a requirement.

Figure 2:
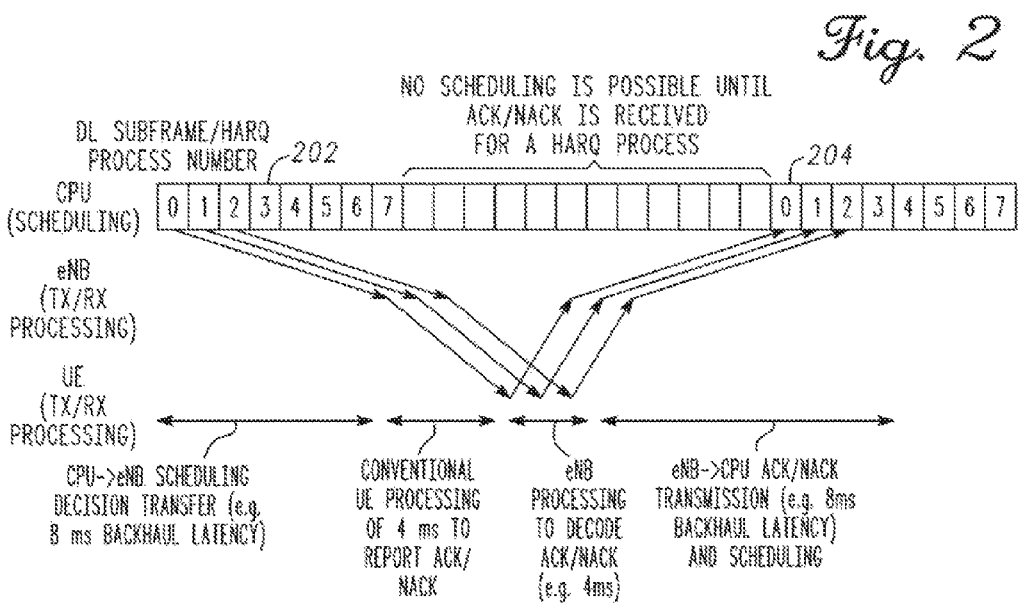
FIG. 2 illustrates hybrid automatic repeat request (HARQ) process number assignment for downlink CoMP transmissions with backhaul link latency.

FIG. 2 illustrates HARQ process number assignment for downlink CoMP transmissions with backhaul link latency. FIG. 3 illustrates HARQ process number assignment for downlink CoMP transmissions with backhaul link latency in accordance with some embodiments. In some embodiments, the scheduling comprises scheduling a number of subframes for transmission by the subordinate eNBs 106, the number being indicated in the HARQ process field, wherein each subframe is associated with one HARQ process 302. In these embodiments, the CPU 104 may refrain from scheduling additional subframes for transmission by the subordinate eNBs 106 until a free HARQ process number 304 is available.

In some embodiments, the CPU 104 may schedule the additional subframes for transmission by the subordinate eNBs 106 when an acknowledge (ACK) or a negative acknowledge (NACK) is received from one of the HARQ processes 304. In these embodiments, a free HARQ process number may not be available until an acknowledge (ACK) or a negative acknowledge (NACK) is received from one of the HARQ processes. In these embodiments, each HARQ process may be associated with a single HARQ process ID. In some embodiments, the number of HARQ processes is configurable to be greater than eight for FDD operation.

FIG. 4A illustrates a number of HARQ processes for various TDD UL/DL configurations in accordance with some embodiments. FIG. 4B illustrates subframe usage for the various TDD UL/DL configurations of FIG. 4A. For TDD operation, the number of HARQ processes may be based on a TDD uplink/downlink (UL/DL) configuration 402.

In some embodiments, the TDD UL/DL configuration 402 indicates particular subframes within a frame for downlink data transmission, for uplink data transmission and for special field transmission. For a TDD UL/DL '0' configuration, the number of subframes is configurable to be greater than four, for a TDD UL/DL '1' configuration, the number of subframes is configurable to be greater than seven, for a TDD UL/DL '2' configuration, the number of subframes is configurable to be greater than ten, for a TDD UL/DL '3' configuration, the number of subframes is configurable to be greater than nine, for a TDD UL/DL '4' configuration, the number of subframes is configurable to be greater than twelve, for a TDD UL/DL '5' configuration, the number of subframes is configurable to be greater than fifteen, and for a TDD UL/DL '6' configuration, the number of subframes is configurable to be greater than six. In these embodiments, TDD operations may use the same frequency bands for the uplink and the downlink. The transmission directions are separated by carrying the UL and DL data in different subframes of a frame as illustrated in FIG. 4B. The distribution of subframes between the transmission directions can be adapted to the data traffic and is done either symmetrically (equal number of DL and UL subframes) or asymmetrically. In FIG. 4B, "D" indicates that DL data is transmitted in this subframe, "U" indicates that uplink data is transmitted, and "S" indicates that the special fields (e.g., DwPTS, GP and UpPTS) may be transmitted in the subframe.

In these embodiments, scheduling or resource assignment decisions are signaled from the CPU 104 to the subordinate eNBs 106 and the subordinate eNBs 106 generate the signals in accordance to the scheduling/resource assignment decisions made by CPU. In some alternate embodiments, the CPU 104 may be part of a serving eNB or master eNB and the subordinate eNBs 106 may be RRHs. In these embodiments, the subframes are generated by the serving eNB and are transmitted to the RRHs over the backhaul links 105 and comprise fully-generated RF signals. The RRHs are configured to convert the fully-generated RF signals to a higher frequency for transmission by one or more antennas for synchronized transmissions to UEs.

Figure 5:
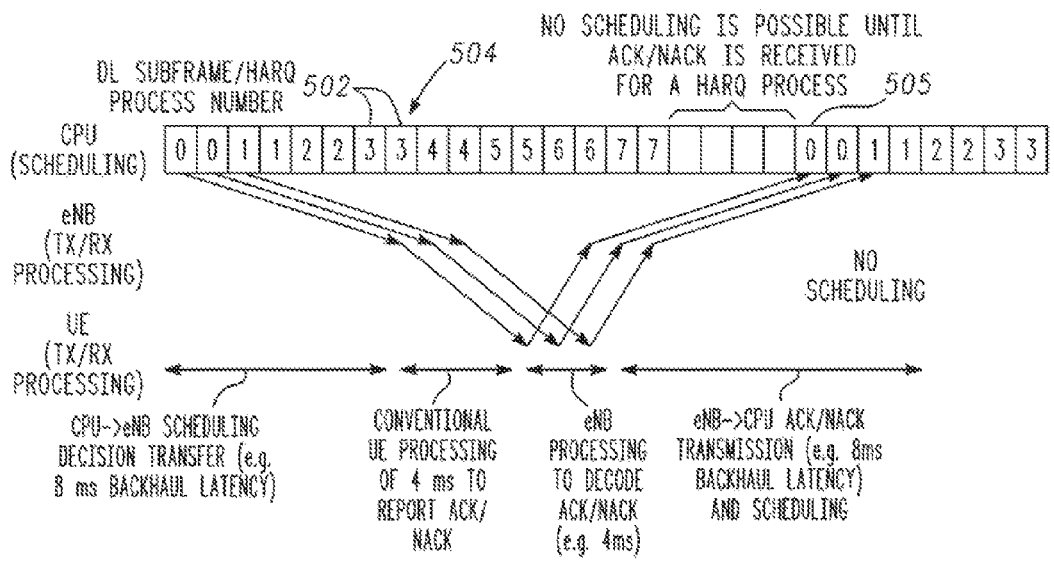
FIG. 5 illustrates HARQ process number assignment for downlink CoMP transmissions with backhaul link latency in accordance with some embodiments.

FIG. 5 illustrates HARQ process number assignment for downlink CoMP transmissions with backhaul link latency in accordance with some embodiments. In some embodiments, the CPU 104 may configure a single resource allocation for UE 102 to span two or more consecutive subframes in the time domain, wherein configuring includes assigning a single HARQ process ID 505 to the single resource allocation. In some of these embodiments, multiple downlink subframes 502 may be bundled into a bundled subframe for the single resource allocation.

In some embodiments, the number of downlink subframes in the single resource allocation is a fixed predetermined number. In the example illustrated in FIG. 5, two downlink subframes 502 are illustrated as being configured for a single resource allocation 504 and having a HARQ process ID of three. Subframes 502 configured for a single resource allocation (e.g., that are bundled into a bundled subframe) have the same HARQ process ID. In some embodiments, a number of downlink subframes in the single resource allocation are configurable by radio-resource control (RRC) signaling.

In some embodiments, the number of downlink subframes to be associated with a single HARQ process may be indicated in an HARQ process field of downlink control information (DCI), the number being at least two. The CPU 104 may schedule and assign resources for subordinate enhanced node Bs (eNBs) 106 over backhaul links 105 for coordinated multi-point (CoMP) transmissions. The scheduling may include a fixed number of HARQ processes. In these embodiments, at least two downlink subframes to be associated with a single HARQ process compensate, at least in part, for backhaul link latency.

Figure 6:
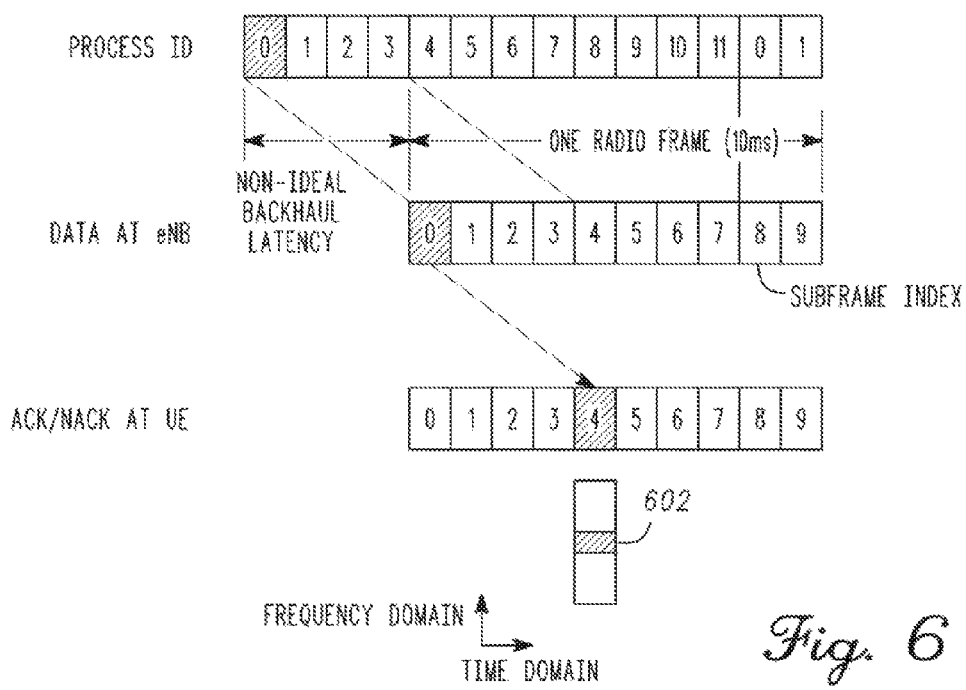
FIG. 6 illustrates reconfiguration of PUCCH resources in accordance with some embodiments.

FIG. 6 illustrates reconfiguration of PUCCH resources in accordance with some embodiments. In some embodiments illustrated in FIG. 6, the CPU 104 may indicate a physical uplink control channel (PUCCH) resource for use by user equipment (UE) in a HARQ acknowledge (ACK) (HARQ-ACK) resource offset (ARO) field. UEs may be semi-statically configured for multiple PUCCH resources 602 for HARQ-ARQ feedback and are configured to dynamically determine the PUCCH resource. In these embodiments, PUCCH resources are preconfigured and known by the CPU 104 to enable the overhearing functionality at the CPU side.

The CPU 104 may be configured to decode HARQ-ACK information received on the indicated (i.e., mapped) PUCCH resource of an associated uplink frame. The subordinate eNBs 106 may be arranged to refrain forwarding HARQ-ACKs to the CPU 104. In these embodiments, latency that conventionally results from the forwarding of HARQ-ACKs from the subordinate eNBs 106 to the CPU 104 may be reduced. In these embodiments, the CPU 104 can receive UL transmissions from the UEs served by the subordinate eNBs 106 for which the CPU 104 performs the decisions. If an eNB provides configuration of PUCCH resources to the CPU 104, the decoding of ACK/NACK feedback from UEs to an eNB can be also performed at the CPU 104. Accordingly, the latency is reduced by avoiding forwarding ACK/NACK from an eNB to CPU 104.

In some embodiments, UEs are semi-statically configured for four or more PUCCH resources. In some embodiments, the PUCCH resource is indicated in downlink control information (DCI) of a corresponding downlink control channel (e.g., EPDCCH or the PDCCH), and the UEs are configured to dynamically determine an exact PUCCH resource from the ARO field in the DCI. In some embodiments, the PUCCH resource is indicated according to a first control channel element (CCH) index or an enhanced CCH (eCCH) index.

In LTE-A Rel-11, the downlink CoMP feature was introduced to cope with interference issues at the network side. To facilitate coordination between the transmission points, deployment scenarios with RRHs (that is today covered by independent eNBs) is assumed. In such scenarios the RRHs are connected to a central eNB by using close-to-ideal backhaul link (e.g. fiber optic links). A central eNB performs scheduling and transmits a fully generated RF signal to each RRH. Then RRH only converts the received signal to higher frequency for transmission over the RRH antennas. While this Rel-11 CoMP approach can dynamically coordinate the transmission from multiple points, its practical implementation is rather difficult as a fiber infrastructure to connect the RRHs with the central eNB is not available in most of the current LTE-A network deployments. Due to this limitation, some operators may not be able to take performance benefit from CoMP operation. Therefore to facilitate CoMP operation in the network with non-ideal backhaul links, enhanced CoMP is considered as part of LTE-A Rel-12. An objective is to evaluate coordinated scheduling and coordinated beamforming (CS/CB) scheme with typical backhaul link.

One of the key challenges from using non-ideal backhaul link is additional latency required for schedulers of independent eNBs to communicate over the backhaul link to synchronize transmissions to UEs. Then the current assumption on 8 ms in FDD for a packet Round-Trip time (RTT, from Tx to Re-Tx) and corresponding number of HARQ processes may not be sufficient to enable CoMP transmissions from all downlink subframes and consequently degrade the expected peak data rate performance FIG. 2 illustrates the issue in more details: In FIG. 2 it is assumed that the scheduling procedure is performed in a central processing unit (CPU), which can be co-located with one of the subordinate eNB. Then the PDSCH scheduling decisions (e.g. resource location, MCS, number of antenna ports, etc.) are conveyed to eNB for baseband and RF processing. It can be seen that due to backhaul link latency 8 HARQ processing is not sufficient to support contiguous transmission from all downlink subframes. Embodiments disclosed herein provide several solutions to support contiguous CoMP transmission from larger number of downlink subframes.

In the first embodiment, the number of HARQ processes is increased in FDD from 8 to 8+x (e.g. x=8) and in TDD from y to y+x, where y is the existing number of HARQ processes supported in the LTE specification for a given TDD UL/DL configuration. To support this proposal the DCI format 2D is modified to DCI format 2E by increasing the size of the HARQ process number field from 3 bits to 4 bits (or other value above 4) in FDD and 4 bits to 5 bits (or other value above 5) in TDD. FIG. 3 illustrates the usage of larger number of HARQ processes.

The number of HARQ processes is 8 in FDD system and y in TDD system as shown in FIG. 4A that is associated with one particular TDD UL/DL configuration in accordance with these embodiments.

In a second embodiment (illustrated in FIG. 5), multiple downlink subframes can be bundled and one HARQ process ID can be used to schedule the transmission from bundled subframe. FIG. 5 illustrates the usage of downlink subframe bundling. The number of downlink subframes participating in bundling can be fixed or RRC configurable. Additionally, to avoid the HARQ-ACK forwarding from eNB to CPU, one alternative solution can be described as follows:

Step-1: UE is semi-statically configured with M PUCCH resources (e.g. M=4) for HARQ-ACK feedback by following existing HARQ-ACK timeline for PDSCH.

In a third embodiment, four semi-statically configured value of PUCCH format 3 resources may be pre-configured for the UE and the exact PUCCH resource may be dynamically determined from the HARQ-ACK resource offset (ARO) field in the DCI format of the corresponding EPDCCH/PDCCH that is known at CPU side.

In a fourth embodiment, the value, referring to the number of the first CCE or eCCE used for transmission of the corresponding PDCCH in subframe n is known at CPU, and consequently the PUCCH resource associated with this PDSCH is known to CPU according to the existing PUCCH resource mapping method, when UE is configured with PUCCH format 1b with channel selection. FIG. 6 illustrates reconfiguration of PUCCH resources in accordance with these embodiments Step-2: For a PDSCH transmission indicated by the detection of corresponding PDCCH or EPDCCH, or a PDCCH or EPDCCH indicating downlink semi-persistent scheduling (SPS) release in sub-frame n, the PUCCH resource for HARQ-ACK feedback is determined either according to higher layer configuration and ARO value in DCI, or according to the first CCE or eCCE index as described in step-1. UE feedback the HARQ-ACK information using the mapped PUCCH resource following the existing HARQ-ACK timeline. There is no change regarding the HARQ-ACK feedback at UE side regarding HARQ-ACK timing aspect.

Step-3: CPU decodes the HARQ-ACK information on the mapped PUCCH resource of associated UL subframe.

In some embodiments, the UE 102 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 102 may include one or more of a keyboard, a display, a non-volatile memory port, multiple antennas, a graphics processor, an application processor, speakers, and other mobile device elements. The display may be an LCD screen including a touch screen. In some embodiments, eNBs 106 and the UE may employ multiple antennas for multiple-input multiple-output (MIMO) operation.

4G LTE CoMP closely coordinates the operations between a number of geographically separated eNBs to provide joint scheduling and transmissions as well as proving joint processing of the received signals. In this way a UE at the edge of a cell is able to be served by two or more eNBs to improve signals reception/transmission and increase throughput particularly under cell edge conditions.

In essence, 4G LTE CoMP, Coordinated Multipoint falls into two major categories—Joint processing and/or coordinated scheduling or beamforming. Joint processing occurs where there is coordination between multiple entities—base stations—that are simultaneously transmitting or receiving to or from UEs. Coordinated scheduling or beamforming is often referred to as CS/CB (coordinated scheduling/coordinated beamforming) is a form of coordination where a UE is transmitting with a single transmission or reception point—base station. However the communication is made with an exchange of control among several coordinated entities. To achieve either of these modes, highly detailed feedback is required on the channel properties in a fast manner so that the changes can be made. The other requirement is for very close coordination between the eNBs to facilitate the combination of data or fast switching of the cells. The techniques used for coordinated multipoint, CoMP are different for the uplink and downlink. This results from the fact that the eNBs are in a network, connected to other eNBs, whereas the handsets or UEs are individual elements.

Downlink LTE CoMP

The downlink LTE CoMP requires dynamic coordination amongst several geographically separated eNBs transmitting to the UE. The two formats of coordinated multipoint can be divided for the downlink:

Joint processing schemes for transmitting in the downlink: Using this element of LTE CoMP, data is transmitted to the UE simultaneously from a number of different eNBs. The aim is to improve the received signal quality and strength. It may also have the aim of actively cancelling interference from transmissions that are intended for other UEs. This form of coordinated multipoint places a high demand onto the backhaul network because the data to be transmitted to the UE needs to be sent to each eNB that will be transmitting it to the UE. This may easily double or triple the amount of data in the network dependent upon how many eNBs will be sending the data. In addition to this, joint processing data needs to be sent between all eNBs involved in the CoMP area.

Coordinated scheduling and or beamforming: Using this concept, data to a single UE is transmitted from one eNB. The scheduling decisions as well as any beams are coordinated to control the interference that may be generated. One advantage of this approach is that the requirements for coordination across the backhaul network are considerably reduced for two reasons: UE data does not need to be transmitted from multiple eNBs, and therefore only needs to be directed to one eNB. The scheduling decisions and details of beams may be coordinated between multiple eNBs.

Uplink LTE CoMP

Joint reception and processing: The basic concept behind this format is to utilize antennas at different sites. By coordinating between the different eNBs it is possible to form a virtual antenna array. The signals received by the eNBs are then combined and processed to produce the final output signal. This technique allows for signals that are very low in strength, or masked by interference in some areas to be receiving with few errors. One disadvantage with this technique is that large amounts of data need to be transferred between the eNBs for it to operate.

Coordinated scheduling: This scheme operates by coordinating the scheduling decisions amongst the ENBs to minimize interference. As in the case of the downlink, this format provides a much reduced load in the backhaul network because only the scheduling data needs to be transferred between the different eNBs that are coordinating with each other.

In some embodiments, the operations performed by CPU 104 may be performed by one or more of the functional elements and may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a central processing unit (CPU) in a Third Generation Partnership Project Long Term Evolution (3GPP LTE) network, the method comprising:
   scheduling and assigning resources for subordinate enhanced node Bs (eNBs) over backhaul links for coordinated multi-point (CoMP) transmissions, the scheduling including an additional number of hybrid automatic repeat request (HARQ) processes to compensate, at least in part, for backhaul link latency, wherein:
      the scheduling comprises scheduling a number of subframes for transmission by the subordinate eNBs,
      the scheduling includes configuring downlink control information (DCI) to include a HARQ process number field with additional bits to indicate the additional number of HARQ processes, the number of subframes is indicated in the HARQ process number field, and each subframe is associated with one HARQ process, and
      for frequency-division duplex (FDD) operation, the DCI is configured to include a HARQ process number field having four or more bits, and for time-division duplex (TDD) operation, the DCI is configured to include a HARQ process number field having five or more bits; and
   refraining from scheduling additional subframes for transmission by the subordinate eNBs until a free HARQ process number is available.

2. The method of claim 1 wherein the subordinate eNBs are arranged to perform baseband processing and LTE subframe generation in response to scheduling information and assignment of resources by the CPU, and
   wherein the subordinate eNBs are arranged for CoMP operation for transmission to and reception of subframes from user equipment (UE).

3. The method of claim 1 further comprising the CPU scheduling the additional subframes for transmission by the subordinate eNBs when an acknowledge (ACK) or a negative acknowledge (NACK) is received from one of the HARQ processes.

4. The method of claim 1 wherein the number of HARQ processes is configurable to be greater than eight for FDD operation, and
   wherein for TDD operation, the number of HARQ processes is based on a TDD uplink/downlink (UL/DL) configuration.

5. The method of claim 4 wherein the TDD UL/DL configuration indicates particular subframes within a frame for downlink data transmission, for uplink data transmission and for special field transmission;
wherein for a TDD UL/DL '0' configuration, the number of subframes is configurable to be greater than four;
wherein for a TDD UL/DL '1' configuration, the number of subframes is configurable to be greater than seven;
wherein for a TDD UL/DL '2' configuration, the number of subframes is configurable to be greater than ten;
wherein for a TDD UL/DL '3' configuration, the number of subframes is configurable to be greater than nine;
wherein for a TDD UL/DL '4' configuration, the number of subframes is configurable to be greater than twelve;
wherein for a TDD UL/DL '5' configuration, the number of subframes is configurable to be greater than fifteen;
wherein for a TDD UL/DL '6' configuration, the number of subframes is configurable to be greater than six.

6. The method of claim 1 further comprising:
bundling multiple downlink subframes into a single bundled subframes; and
associating a single HARQ process identifier (ID) with each bundled subframe,
wherein each bundled subframe includes at least two downlink subframes.

7. A central processing unit (CPU) arranged to operate in a Third Generation Partnership Project Long Term Evolution (3GPP LTE) network, the CPU comprising processing circuitry and network interface circuitry arranged to schedule and assign resources for subordinate enhanced node Bs (eNBs) over backhaul links for coordinated multi-point (CoMP) transmissions, the scheduling including an additional number of hybrid automatic repeat request (HARQ) processes to compensate, at least in part, for backhaul link latency,
wherein the scheduling includes configuring downlink control information (DCI) to include a HARQ process number field with additional bits to indicate the additional number of HARQ processes,
wherein for frequency-division duplex (FDD) operation, the DCI is configured to include an HARQ process number field having four or more bits, and for time-division duplex (TDD) operation, the DCI is configured to include an HARQ process number field having five or more bits,
the scheduling comprises scheduling a number of subframes for transmission by the subordinate eNBs, the number of subframes is indicated in the HARQ process number field, and each subframe is associated with one HARQ process, and
the processing circuitry and network interface circuitry is further arranged to refrain from scheduling additional subframes for transmission by the subordinate eNBs until a free HARQ process number is available.

8. A computer-readable storage medium that stores instructions for execution by one or more processors of a central processing unit (CPU) in a Third Generation Partnership Project Long Term Evolution (3GPP LTE) network, the one or more processors to configure the CPU to:
schedule and assign resources for subordinate enhanced node Bs (eNBs) over backhaul links for coordinated multi-point (CoMP) transmissions, and
refrain from scheduling additional subframes for transmission by the subordinate eNBs until a free HARQ process number is available,
wherein the one or more processors configure the CPU to schedule the resources by at least including an additional number of hybrid automatic repeat request (HARQ) processes to compensate, at least in part, for backhaul link latency,
the scheduling comprises scheduling a number of subframes for transmission by the subordinate eNBs,
the scheduling includes configuring downlink control information (DCI) to include a HARQ process number field with additional bits to indicate the additional number of HARQ processes, the number of subframes is indicated in the HARQ process number field, and each subframe is associated with one HARQ process, and
for frequency-division duplex (FDD) operation, the DCI is configured to include a HARQ process number field having four or more bits, and for time-division duplex (TDD) operation, the DCI is configured to include a HARQ process number field having five or more bits.

9. The medium of claim 8 wherein the one or more processors further configure the CPU to schedule the additional subframes for transmission by the subordinate eNBs when an acknowledge (ACK) or a negative acknowledge (NACK) is received from one of the HARQ processes.

10. The medium of claim 8 wherein the number of HARQ processes is configurable to be greater than eight for FDD operation, and
wherein for TDD operation, the number of HARQ processes is based on a TDD uplink/downlink (UL/DL) configuration.

11. The medium of claim 10 wherein the TDD UL/DL configuration indicates particular subframes within a frame for downlink data transmission, for uplink data transmission and for special field transmission;
wherein for a TDD UL/DL '0' configuration, the number of subframes is configurable to be greater than four;
wherein for a TDD UL/DL '1' configuration, the number of subframes is configurable to be greater than seven;
wherein for a TDD UL/DL '2' configuration, the number of subframes is configurable to be greater than ten;
wherein for a TDD UL/DL '3' configuration, the number of subframes is configurable to be greater than nine;
wherein for a TDD UL/DL '4' configuration, the number of subframes is configurable to be greater than twelve;
wherein for a TDD UL/DL '5' configuration, the number of subframes is configurable to be greater than fifteen;
wherein for a TDD UL/DL '6' configuration, the number of subframes is configurable to be greater than six.

12. The medium of claim 8 wherein the one or more processors further configure the CPU to:
bundle multiple downlink subframes into a single bundled subframes; and
associate a single HARQ process ID with each bundled subframe,
wherein each bundled subframe includes at least two downlink subframes.

* * * * *